US011086592B1

(12) United States Patent
Wang

(10) Patent No.: US 11,086,592 B1
(45) Date of Patent: Aug. 10, 2021

(54) DISTRIBUTION OF AUDIO RECORDING FOR SOCIAL NETWORKS

(71) Applicant: Twitter, Inc., San Francisco, CA (US)

(72) Inventor: Sean Wang, Sammamish, WA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 14/080,706

(22) Filed: Nov. 14, 2013

(51) Int. Cl.
*G06F 3/048* (2013.01)
*G06F 3/16* (2006.01)

(52) U.S. Cl.
CPC .................................. *G06F 3/167* (2013.01)

(58) Field of Classification Search
CPC ........ G06Q 10/10; G06Q 50/01; H04L 29/06; G06F 3/167; G06F 16/683; G10L 19/018; G10L 25/48; G10L 25/54; H04N 21/4394; H04N 21/233
USPC .......................................... 709/204; 713/185
See application file for complete search history.

(56) References Cited

U.S. PATENT DOCUMENTS

| | | | | |
|---|---|---|---|---|
| 8,370,062 B1* | 2/2013 | Starenky | ............... | H04W 4/025 701/467 |
| 2003/0033533 A1* | 2/2003 | Meisel | .......................... | 713/185 |
| 2003/0106413 A1* | 6/2003 | Samadani | ............... | G10H 1/00 84/603 |
| 2008/0120501 A1* | 5/2008 | Jannink et al. | ............... | 713/163 |
| 2011/0083101 A1* | 4/2011 | Sharon et al. | ................ | 715/800 |
| 2012/0017150 A1* | 1/2012 | Pollack | ......................... | 715/716 |
| 2012/0201362 A1* | 8/2012 | Crossan | .................. | G10L 15/26 379/88.01 |
| 2012/0278387 A1* | 11/2012 | Garcia | ................... | G06Q 50/01 709/204 |
| 2013/0166639 A1* | 6/2013 | Shaffer et al. | ................. | 709/204 |
| 2013/0346337 A1* | 12/2013 | O'Donnell et al. | .......... | 705/333 |
| 2014/0012927 A1* | 1/2014 | Gertzfield et al. | ............ | 709/206 |
| 2014/0025699 A1* | 1/2014 | Mallinson | .............. | G06Q 30/02 707/758 |
| 2014/0033018 A1* | 1/2014 | Pallai | .................... | G06F 16/972 715/234 |
| 2014/0088971 A1* | 3/2014 | Metcalf | ...................... | 704/270.1 |
| 2015/0100632 A1* | 4/2015 | Panjabi | ......................... | 709/204 |
| 2015/0104023 A1* | 4/2015 | Bilobrov | ............... | G06F 16/683 381/56 |

FOREIGN PATENT DOCUMENTS

WO        WO 9941748 A1 *   8/1999

* cited by examiner

*Primary Examiner* — Alex Olshannikov
(74) *Attorney, Agent, or Firm* — Fish & Richardson P.C.

(57) ABSTRACT

A method for integrating audio recording and distributing. The method can include: detecting a user interface selection made by a user of a computing device; recording an audio snippet in response to the user interface selection; generating, by the first computing device, a social network message including an indication of the audio snippet; and transmitting the social network message to an external server for broadcasting to a set of user accounts of a real-time messaging platform.

25 Claims, 12 Drawing Sheets

DISTRIBUTION OF AUDIO RECORDING FOR SOCIAL NETWORKS

BACKGROUND

The development and proliferation of sophisticated mobile computing devices such as smart phones and tablets have likely contributed to a rise in the usage of social networking messaging platforms and applications. With increasingly powerful computing devices and extensive mobile networks, social networking has become available at any time, and almost everywhere. Popular real-time messaging platforms often provide functionality for users to draft and send messages (both synchronously and asynchronously) to other users. Other common features include the ability to "post" messages that are visible to one or more identified other users of the platform, or even publicly to any user of the platform without specific designation by the authoring user.

SUMMARY

In general, in one aspect, the invention relates to a method for integrating audio recording and distributing. The method can include: detecting a user interface selection made by a user of a computing device; recording an audio snippet in response to the user interface selection; generating, by the first computing device, a social network message including an indication of the audio snippet; and transmitting the social network message to an external server for broadcasting to a set of user accounts of a real-time messaging platform.

In general, in one aspect, the invention relates to a method for distributing recorded audio snippets. The method can include: receiving, from a client computing device, a recorded audio snippet and an identification of a social network message drafted by a user of a real-time messaging platform; storing the recorded audio snippet in a storage repository; associating the recorded audio snippet with the social network message in the real-time messaging platform; and providing the social network message with a reference to the recorded audio snippet to a plurality of social media accounts of the real-time messaging platform.

In general, in one aspect, the invention relates to a system for distributing recorded audio snippets. The system can include: a computer processor; an audio repository configured to store a plurality of recorded audio snippets and a plurality of associations between a plurality of drafted social network messages and the plurality of recorded audio snippets; and a memory comprising an audio module. In one or more embodiments, the audio module can be configured to execute on the computer processor to enable the computer processor to receive a recorded audio snippet and an identification of a social network message drafted by a user of a real-time messaging platform from a client device, store the recorded audio snippet in the audio repository, associate the recorded audio snippet with the social network message in the real-time messaging platform, and provide the social network message with a reference to the recorded audio snippet for a plurality of social media accounts of the real-time messaging platform.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1A:
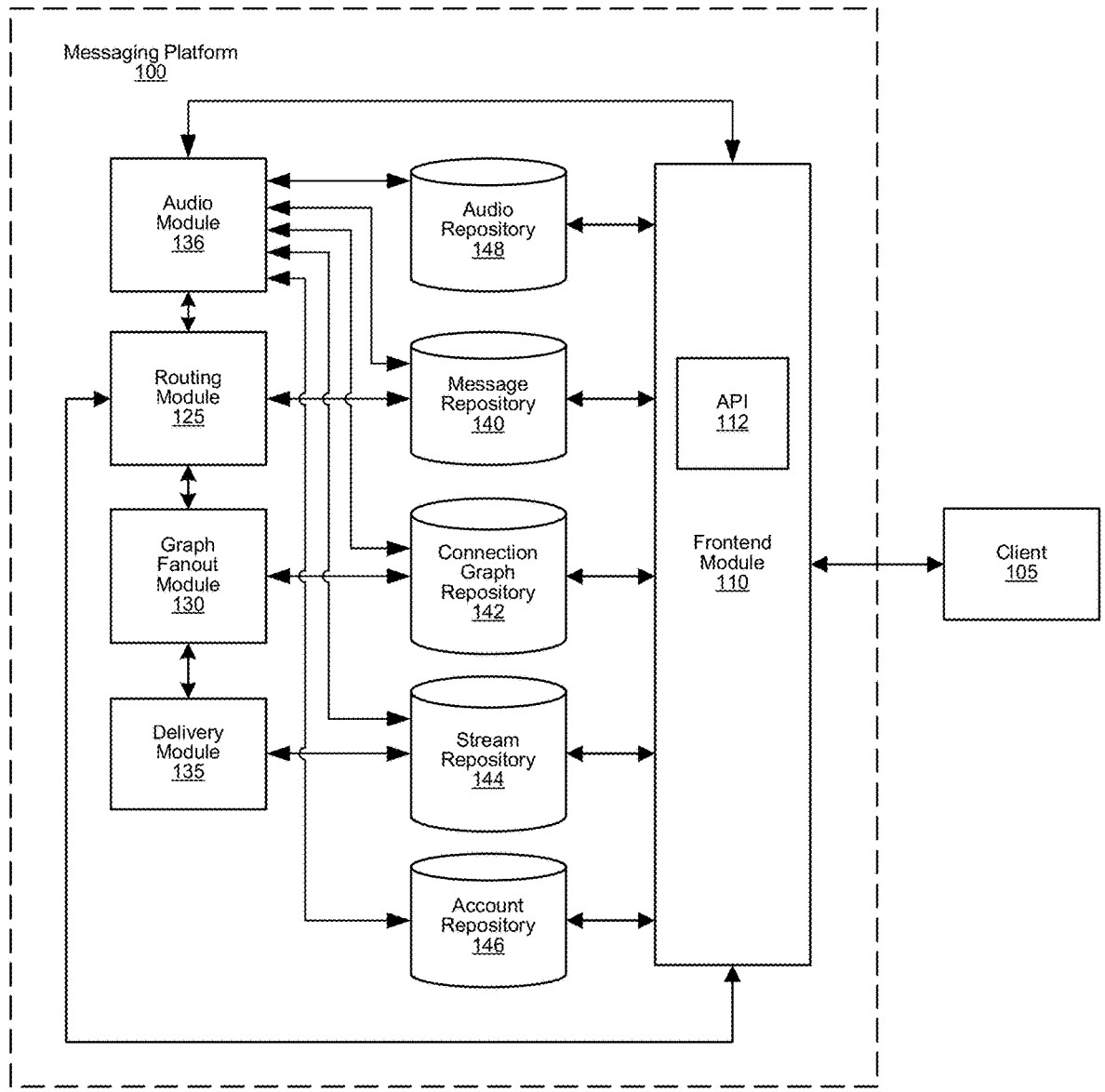
FIG. 1A shows a schematic diagram of a system, in accordance with one or more embodiments of the invention.

Reference will now be made in detail to the various embodiments of the present disclosure, examples of which are illustrated in the accompanying drawings. While described in conjunction with these embodiments, it will be understood that the provided examples are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Like elements in the various figures are denoted by like reference numerals for consistency.

In general, embodiments of the invention provide methods and systems for distributing recorded audio snippets with messages (e.g., messages in a real-time messaging platform) and for integrating audio recording and message distribution in a platform. In one or more embodiments, messages posted to a real-time messaging platform are required to be within a maximum length (e.g., character count). In one or more embodiments, hyperlinks and non-textual content (such as the aforementioned audio recordings) can be excluded from a maximum length determination of the message, in accordance with various embodiments. It should be appreciated that one or more embodiments of the invention are discussed with reference to messages in a real-time messaging platform, but that one or more embodiments of the invention can also include messages accompanied with audio recordings in any platform. In one or more embodiments, a user interface selection indicating an initiation of an audio recording may be received from a client. Upon initiation, audio recording may be performed until a subsequent user interface selection may be detected or a maximum length of the recording may be exceeded. A portion of text drafted by the user through the user interface of the client may be also received prior to, or subsequently from, the audio recording. The portion of text may be used to generate a message and the message and audio recording (a "snippet") may be transmitted to an external server for storage and/or distribution.

In one or more embodiments, a system hosting data corresponding to a distributed real-time messaging platform is provided. According to such embodiments, the system may be implemented as one or more computing devices configured to receive data from corresponding applications executing in remote and discrete mobile computing devices. In one or more embodiments, this data may include an encoded audio recording, a drafted text message, an image, an encoded video recording, and a user-specified designation associating two or more of these elements. In one or more embodiments, various data repositories may be implemented in the system to store the received data, e.g., an audio repository may be implemented to store received audio streams and an association within the system to a drafted text message. Thereafter, the system may provide user accounts of the distributed real-time messaging platform access to the message and a reference to the audio recording. These user accounts may be identified by the authoring user of the audio recording and/or message, or may be automatically determined by the system according to pre-established associations, or other factors and shared characteristics (e.g., location, age, workplace, school, etc.)

FIG. 1A shows a real-time messaging platform (100) and a client (105) in accordance with one or more embodiments of the invention. As shown in FIG. 1A, the real-time messaging platform (100) has multiple components including a frontend module (110) with an application programming interface (API) (112), a routing module (125), a graph fanout module (130), a delivery module (135), an audio module (136), a message repository (140), a connection graph repository (142), a stream repository (144), an account repository (146), and an audio repository (148). Various components of the real-time messaging platform (100) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention.

In one or more embodiments of the invention, the real-time messaging platform (100) is a platform for facilitating real-time communication between one or more entities. For example, the real-time messaging platform (100) may store millions of accounts of individuals, businesses, and/or other entities (e.g., pseudonym accounts, novelty accounts, etc.). One or more users of each account may use the real-time messaging platform (100) to send messages to other accounts inside and/or outside of the real-time messaging platform (100). The real-time messaging platform (100) may be configured to enable users to communicate in "real-time", i.e., to converse with other users with a minimal delay and to conduct a conversation with one or more other users during simultaneous sessions. In other words, the real-time messaging platform (100) may allow a user to broadcast messages and may display the messages to one or more other users within a reasonable time frame so as to facilitate a live conversation between the users. Recipients of a message may have a predefined graph relationship (e.g., a connection graph) with an account of the user broadcasting the message. In one or more embodiments of the invention, the user is not an account holder or is not logged in to an account of the real-time messaging platform (100). In this case, the real-time messaging platform (100) may be configured to allow the user to broadcast messages and/or to utilize other functionality of the real-time messaging platform 100 by associating the user with a temporary account or identifier.

Returning to FIG. 1A, in one or more embodiments of the invention, one or more of the data repositories (message repository (140), connection graph repository (142), stream repository (144), account repository (146), and audio repository (148)) is a database and/or storage service residing on one or more servers. For example, one or more of the data repositories may be implemented as a storage service using service-oriented architecture (SOA) and configured to receive requests for data and to provide requested data to other components of the real-time messaging platform (100). In another example, the message repository (140) can include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application can be used, in accordance with various embodiments of the invention.

In one or more embodiments of the invention, one or more of the data repositories (message repository (140), connection graph repository (142), stream repository (144), account repository (146), audio repository (148)) is a separate application or set of applications residing on one or more servers external (and communicatively coupled) to the real-time messaging platform (100). Alternatively, in one or more embodiments of the invention, one or more of the data repositories can be an integrated component of the real-time messaging platform (100) and/or can reside, either partially or entirely, on one or more common hardware devices (e.g., a server).

In one or more embodiments of the invention, the routing module (125) includes functionality to receive one or more messages and to store the messages in the message repository (140). The routing module (125) can be configured to assign an identifier to the message and to notify the graph fanout module (130) of a sender of the message.

In one or more embodiments of the invention, the routing module (125) includes functionality for indexing one or more new messages. The routing module (125) can be configured to assign a document identifier to each new message and to use the document identifier as an input to the mathematical function.

In one or more embodiments of the invention, the graph fanout module (130) includes functionality to retrieve graph data from the connection graph repository (142) and to use the graph data to determine which accounts in the real-time messaging platform (100) should receive the message. The graph data, for example, can reflect which accounts in the real-time messaging platform are "following" a particular account and are, therefore, subscribed to receive status messages from the particular account.

In one or more embodiments of the invention, the delivery module (135) includes functionality to receive a list of accounts from the graph fanout module (130) and the message identifier generated by the routing module (125) and to insert the message identifier into stream data associated with each identified account. The delivery module (135)

can then store the message list in the stream repository (144). The stream data stored in the stream repository (144) can make up one or more streams associated with one or more accounts of the real-time messaging platform (100). A stream may be a dynamic list of messages associated with one or more accounts or can reflect any arbitrary organization of messages that is advantageous for the user of an account.

In one or more embodiments of the invention, the frontend module (110) is a software application or a set of related software applications configured to communicate with external entities (e.g., the client (105)). The frontend module (110) can include the application programming interface (API) (112) and/or any number of other components used for communicating with entities outside of the real-time messaging platform (100). The API (112) can include any number of specifications for making requests from and/or providing data to the real-time messaging platform (100). For example, a function provided by the API (112) can initiate an audio recording session within a requesting client (105). Alternatively, a function provided by the API (112) can present and apply audio effects to a recorded audio snippet in the client (105).

In one or more embodiments of the invention, the frontend module (110) is configured to use one or more of the data repositories (the message repository (140), the connection graph repository (142), the stream repository (144), the account repository (145), and/or the audio repository (148)) to define streams for serving messages (i.e., stream data) to a user of the account on the real-time messaging platform (100). A user can use any client (105) to receive the messages. For example, where the user uses a web-based client to access the real-time messaging platform (100), the API (112) can be utilized to define one or more streams and/or to serve the stream data to the client for presentation to the user. Similarly, different forms of message delivery can be handled by different modules in the frontend module (110). In one or more embodiments of the invention, the user can specify particular receipt preferences which are implemented by the frontend module (110).

In one or more embodiments of the invention, the frontend module 110 may include functionality to receive, process, and disseminate location information sent from mobile computing devices and corresponding to users of applications of the real-time messaging platform (100). The location information may be determined according to various geo-location methods, including but not limited to Global Positioning System (GPS) services, wireless location services, radio location services, etc. Location information for each user may be periodically (or continuously, in some embodiments) tracked and stored in a location history repository mapped to the user. Drafted social network messages corresponding to audio recordings produced by a user may be accompanied by the location of the user at the time of recording.

In one or more further embodiments, an audio recording may be cross-referenced with the location information to determine known events (such as presentations, concerts, musical performances, public speeches, etc.) within a predetermined proximity as candidates for the source of the audio output including the audio recording. The candidate source may be presented to the authoring user to confirm the source. If confirmed, the identity and/or location of the source may be appended to the social network message or a new social network message may be automatically generated and distributed with the location and identity of the source.

In one or more embodiments of the invention, the audio repository (148) includes functionality to store a set of recorded audio snippets. The audio repository (148) may, in one or more embodiments, be configured to store the set of recorded audio snippets with associations to a drafted message, and/or a user presence (e.g., the authoring user). In one or more embodiments, the format of the audio snippets may be altered (e.g., encoded, transcoded, encrypted, and/or compressed) in the mobile computing device prior to transmission to the frontend module 110. According to such embodiments, the format of the audio snippets may be unaltered (e.g., decoded, retranscoded, unencrypted, and/or uncompressed) once received and stored in the audio repository (148) in a partially altered or the unaltered format. In one or more embodiments, the audio snippets may be stored in an altered format (e.g., encoded), whereby unfaltering (e.g., decoding) is performed in the receiving computing devices for playback.

In one or more embodiments of the invention, the audio repository (148) includes functionality to store a set of associations between a set of drafted social network messages and the set of recorded audio snippets. The set of associations may be implemented as a map of associations, wherein authoring user accounts may be mapped to social network messages drafted by the authoring user account and/or recorded audio snippets produced by the authoring user account. User accounts and/or specific drafted messages may be mapped with target user accounts, such that user accounts designated to receive or have access to material (e.g., messages, audio recordings, images, video recordings, etc.) produced by a user account may be readily discerned. In one or more embodiments, associations between elements may be mapped in chronological (or reverse chronological order).

In one or more embodiments of the invention, the audio module (136) includes functionality to receive, from a client computing device, a recorded audio snippet and an identification of a social network message drafted by a user of a real-time messaging platform. The identification may include, for example, a reference within the system that identifies the corresponding social network message and the authoring user account of the corresponding social network message. In one or more embodiments, the reference may be implemented as a numeric or alphanumeric code and/or may be generated automatically by an application of the real-time messaging platform executing in the client computing device. To preserve data transmission bandwidth and/or memory, recorded audio snippets may be encoded (compressed) after recordation in a mobile computing device and prior to transmission (e.g., to the frontend module (110)). Once received, the frontend module (110) may forward the received audio data to the audio module (136). The audio module (136) may be configured to determine the file format or encoding scheme. In one or more further embodiments, the audio module (136) may decode (extract) encoded audio files prior to storage in the audio repository (148). When the reference to the audio recording is played by receiving users, the audio module (136) may re-encode the file prior to transmission. Alternately, when audio files are received in uncompressed format, the audio module (136) may compress the audio files prior to storage in the audio repository (148), or may use an alternate compression algorithm.

In one or more embodiments of the invention, the audio module (136) includes functionality to associate the recorded audio snippet with the social network message in the real-time messaging platform. For example, mapping of the recorded audio snippets with the social network message as described above may be performed by the audio module (136). A data structure (e.g., a map) of the association may be generated in the audio module (136) and stored in the audio repository (148). In further embodiments, the data structures representing the associations within the real-time messaging platform may be stored in separate repositories in lieu of, or in addition to, the audio repository (148).

In one or more embodiments of the invention, the audio module (136) includes functionality to provide the social network message with a reference to the recorded audio snippet for a set of social media accounts of the real-time messaging platform. For example, the reference to the recorded audio snippet may include a uniform resource location (URL) link to a web address corresponding to the real-time messaging platform. The audio module (136) may generate the link to the recorded audio snippet, or, alternately, may track and store the association of URLs for recorded audio snippets, which the audio module (136) is able to reference.

In one or more embodiments of the invention, the audio module (136) includes functionality to provide a telephonic code, which provides access to playback of the recorded audio snippet. For example, the audio module (136) may include functionality to generate a unique (in some embodiments, temporary) numeric access code. Users of the real-time messaging platform that receive the access code may use a telephone to dial a pre-determined telephone number and enter the access code to initiate a playback session of the audio recording through the telephone. In one or more embodiments, the audio module (136) may also be configured to generate an instance ID paired with the access code. In these embodiments, the instance ID may constitute a separate sequence of numbers that identify (within the system) the specific audio recording. Each of the access code and/or the instance IDs may be mapped by the audio module (136) and stored (e.g., in the audio repository 148 or other storage device).

In one or more embodiments of the invention, the audio module (136) includes functionality to apply one or more audio filters to a received audio recording. The audio module (136) may receive a set of audio filter identifiers (e.g., through the frontend module (110)), selected by the user through a user interface. The audio module (136) may include pre-stored functionality to apply the audio filters corresponding to the audio filter identifiers to the recorded audio snippet. These filters may include, for example, sound effects, or global alterations to the recordings (e.g., changes in tone, pitch, volume, etc.). Other filters include, but are not limited to, editing of the audio snippet, reduction in detected background noise, a mesh of the audio snippet with a set of pre-stored audio snippets (both snippets recorded by the authoring user or otherwise); and/or a concatenation of the audio snippet with a set of pre-stored audio snippets.

In one or more embodiments of the invention, the audio module (136) may include functionality to transcribe a verbal audio recording into text. The audio module (136) may selectively parse an audio recording for spoken words and/or known phrases and may apply a transcription engine to generate a transcription of the audio recording automatically. In further embodiments, certain words or phrases may be transcribed as pre-determined slang, icons, text, or other textual output. In still further embodiments, highly topical, popular, or "trending" terms or phrases may be specifically identified and highlighted or otherwise emphasized in a transcribed message. For example, signal or action terms corresponding to the message platform may be automatically transcribed as non-literal pre-determined output. Transcriptions may also be stored and mapped to the original audio recording. In one or more embodiments, a social network message drafted by an authoring user may be automatically vocalized with pre-determined speech patterns by the audio module (136). In such instances, the message is parsed and matched using a voice engine to pronounce each word. The resulting audio output sequence may be stored and distributed to designated user accounts as a recorded audio recording.

In one or more embodiments of the invention, the audio module (136) includes functionality to translate a verbal audio recording into a different language. The audio module (136) may selectively parse an audio recording for individual spoken words or known phrases and generate an automated translation into a different language (as selected by the user). The automated translation may also be stored mapped the original audio recording. References may be provided to receiving user account(s) to both the original audio recording and the translated recording.

In one or more embodiments of the invention, the audio module (136) may include functionality to match an audio recording with a corresponding audio source. An audio recording that includes, for example, a portion of a song or speech may be identified by audio module (136) by determining an audio identifier, such as an acoustic fingerprint of the recording, and comparing the fingerprint to a database of acoustic fingerprints to attempt to identify the source of the song or speech. A drafted message may be automatically generated providing an identification of the audio source and distributed along with a reference to the audio recording.

In one or more embodiments, the audio module (136) may include functionality to associate one or more keywords to a drafted social message or stored audio recording. These keywords may correspond to advertisements from third parties, with the specific advertisement or sponsor being determined based on the content of the audio recording, or other characteristics pertaining to the user (e.g., monitored shopping or navigation habits, location, age and employment information, etc.) The advertisement(s) or a link to a URL corresponding to the advertisement may be distributed with the link to the audio recording and/or the drafted message to the recipient user accounts.

In one or more embodiments of the invention, frontend module (110) may also include functionality to facilitate a simultaneous real-time or instantaneous exchange of recorded audio snippets. Two or more users of social messaging applications may engage in a temporary session wherein audio snippets may be rapidly exchanged (via the real-time messaging platform 100), wherein recording, transmission, and/or playback is performed without further actuation of a user interface. In such embodiments, a computing device, such as a mobile computing device executing the social messaging application, may enter an active exchange session, wherein detected speech or audio elements are concurrently captured and streamed to the real-time messaging platform (100), and subsequently routed to the computing devices operated by all other users designated to receive the audio recording. Speech or audio elements may be recorded in snippets, and transmitted when a delay, pause, or a pre-determined signal term is detected. Recordation, transmission, and playback may be performed continuously for the duration of the session.

Figure 1B:
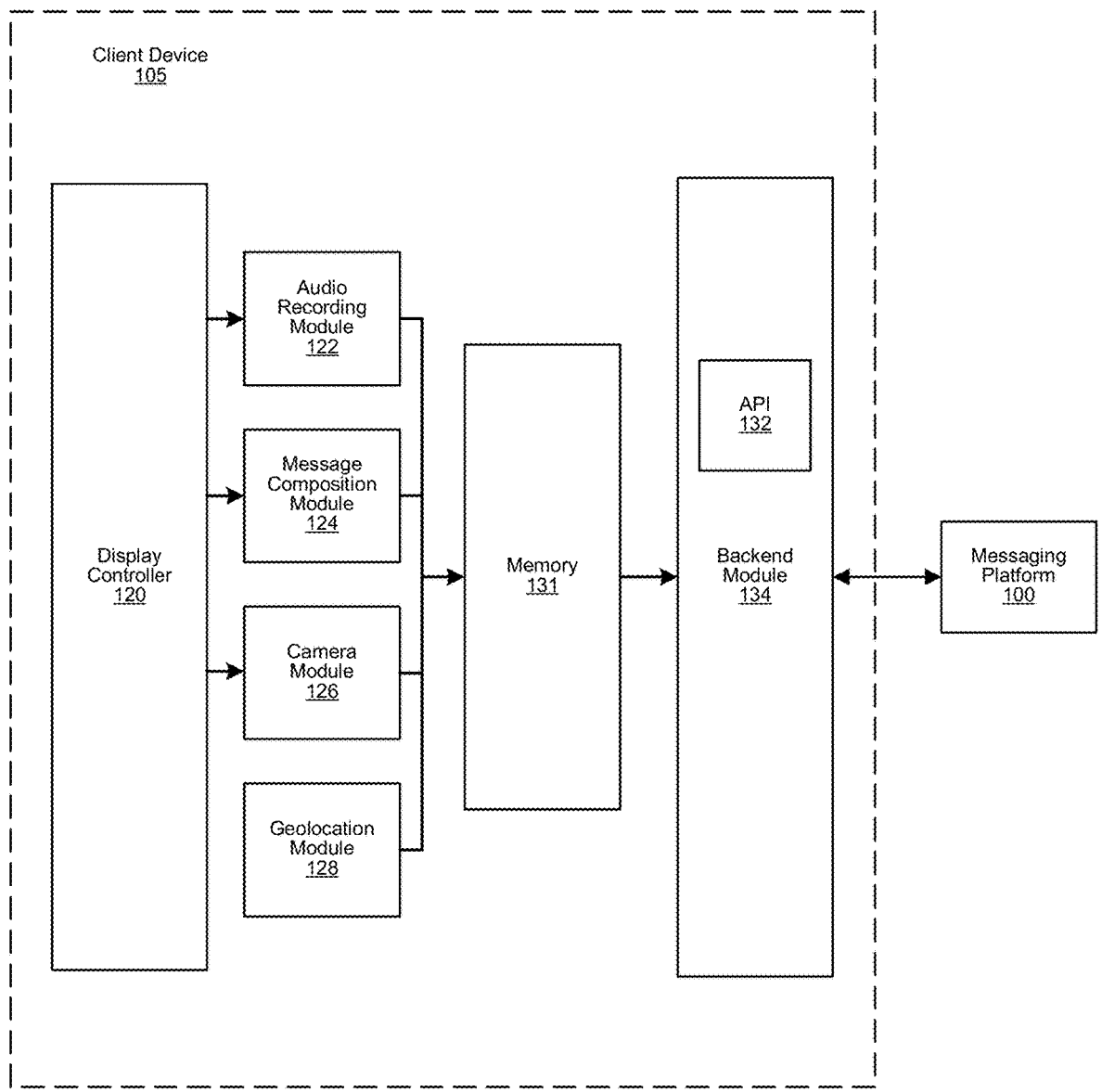
FIG. 1B shows a schematic diagram of a system, in accordance with one or more embodiments of the invention.

FIG. 1B shows a client device (105) in accordance with one or more embodiments of the invention. As shown in FIG. 1B, the client device (105) has multiple components including a relay module (134) with an application programming interface (API) (132), a display controller (120), an audio recording module (122), a message composition module (124), a camera module (126), a geo location module (128), and a memory (131). Those skilled in the art will appreciate that there can be more than one of each separate component running on a device, as well as any combination of these components within a given embodiment of the invention.

In one or more embodiments of the invention, the client device (105) is a mobile computing device executing (e.g., via a processor) an application of a real-time messaging platform (100). For example, a user of the client device (105) may login to an account of the real-time messaging platform (100) through an application of the real-time messaging platform (100) executing in the client device (105). The user may use the application to send messages to other accounts inside and/or outside of the real-time messaging platform (100). The client device (105) may be configured to generate and display (e.g., via the display controller (120)) a graphical user interface of the application in a display panel of the client device (105). Through the graphical user interface, a user may access various features and/or perform various functionalities provided by the application and the real-time messaging platform (100).

In one or more embodiments, a graphical user interface generated by the display controller (120) may be used to initiate an audio recording session. The audio recording session may be initiated via a user selection of a graphical icon or via a predefined gesture, or detected verbal command. In one or more embodiments, an audio recording session continuously records audio emanations via a microphone component in the client device (105). In one or more further embodiments, each audio recording may be limited to a "snippet" of a predetermined duration. Recordings that exceed the threshold duration may be stored as a separate snippet. Recordings may be managed by the audio recording module (122) and stored in a memory (131) of the client device (105).

In one or more embodiments, the audio recording module (122) may include functionality to apply one or more audio filters to a recorded audio snippet. For example, the graphical user interface generated in the display controller (120) may present graphical elements (e.g., a button, icon, scroll bar, text field) representing the available filters. A user of the messaging application may be able to select the graphical elements indicative of the audio filters the user wishes to apply. These audio filters may be maintained in the memory (131) and applied to an audio recording by the audio recording module (122). In one or more embodiments, the graphical user interface may also include functionality to initiate a playback of user-selected audio recordings, with or without applied audio filters. Filtering of a recorded audio snippet may also be performed automatically by the audio recording module (122). For example, the audio recording module (122) may parse a recording to determine periods of audio inactivity that exceeds a pre-determined duration. The periods of audio inactivity may be removed or edited to be of lesser duration.

In one or more embodiments, the audio recording module (122), in conjunction with the relay module (134) and API (132), enables the user of the client device (105) to communicate remotely through an instantiation of the application executing on the client device (105) with other users, each operating through a separate instantiation of the application and executing on a separate client device. These communications may be achieved as a series of exchanges of audio recordings, delivered with a minimal delay during simultaneous sessions, or asynchronously through ongoing sessions of periodic activity. In one or more other embodiments, the audio recording module (122) may allow a user to record audio messages or other snippets to be broadcasted to one or more other users of the real-time messaging platform (100) within a reasonable time frame so as to facilitate a live conversation between the users.

In one or more embodiments of the invention, the message composition module (124) includes functionality to facilitate the composition and management of one or more drafted textual messages and to store the messages in the memory (131). The message composition module (124) may, for example, contain logic to cause the display controller (120) to generate a virtual user input device (such as a virtual keyboard) in order to draft a textual message to be transmitted to the real-time messaging platform (100) and distributed to other users of the real-time messaging platform (100). In one or more embodiments, textual messages may be limited in length to a certain number of characters, wherein messages which exceed the number of characters may be separated in one or more additional messages.

In one or more embodiments, the message composition module (124) may generate one or more message data structures for each drafted message. Textual messages may be drafted to correspond to audio recordings generated with audio recording module (122). These messages may be automatically drafted by the message composition module (124) (e.g., via transcription processes) or may be user-drafted messages. In one example, a user may draft a textual message and then elect to record an associated audio snippet. Drafted messages may be stored in the memory (131) along with metadata associating the drafted message with one or more audio recordings.

In one or more embodiments, the camera module (126) may include functionality to generate image data (e.g., via a camera device in the client device (105)). Image data may be generated to correspond to audio recordings generated with audio recording module (122), to drafted messages created with the message composition module (124), or a combination of the two. Image data generated with the camera module (126) may be stored in the memory (131), along with metadata associating the image data with one or more audio recordings and/or drafted messages.

In one or more embodiments, the geo location module (128) may determine and/or track a location (e.g., a business or organization, a venue, an address, GPS coordinates) of the client device (105) during certain activities or during the performance of one or more tasks. For example, a drafted message (e.g., via the message composition module (124)), an audio recording (e.g., via audio recording module (122)), and/or a generated image (e.g., via camera module (126)) may each or collectively generate one or more timestamps in an operating system executing in the client device (105). At predefined events (e.g., such as the creation of a timestamp) the geo location module (128) may determine the current location of the client device (105) and generate a display of the location for each drafted message, for example. The display may be presented to the user along with an interface that allows the user to accept or decline a request to associate the determined location with the message, audio recording, or image generated. When published (e.g., distributed), the location may be displayed along with the message, image, and/or reference to the audio recording to other users. In one or more further embodiments, the user may manually elect to append a drafted message with the determined location, and/or attach a label of the determined location to a generated image or recorded audio snippet. In still further embodiments, the user may pre-configure the client device (105) to perform these tasks automatically. Determined geo locations may be stored in the memory (131) along with metadata associating the determined geo location with one or more drafted messages, audio recordings, and/or generated images.

In one or more embodiments of the invention, the relay module (134) is a software application or a set of related software applications configured to communicate with external entities (e.g., the real-time messaging platform (100)). The relay module (134) can include the application programming interface (API) (132) and/or any number of other components used for communicating with entities outside of the client device (105). The API (132) can include any number of specifications for making requests from and/or providing data to the client device (105). For example, a function provided by the API (132) can initiate a data transfer session with the real-time messaging platform (100) to offload drafted messages, audio recordings, image data, location data, and/or meta data associating any of these elements from the memory (131) of the client device (105) to one or more data repositories of the real-time messaging platform (100).

Alternatively, a function provided by the API (132) can receive and format message, audio, image, or location data (or references thereto) corresponding to the user account from server-stored entities to be displayed by the display controller (120) in a display panel of the client device (105). In one or more embodiments, messages, audio recordings, images, and location data (e.g., authored by other users of the real-time messaging platform (100)) may be displayed to a user in chronological or reverse chronological order. In one or more further embodiments, a user may be able to filter or arrange the order in which elements are graphically displayed (e.g., by type, author, subject, etc.) In still further embodiments, the application may be able to control the display of one or more graphical elements in the generated display. For example, a display of sponsored content or advertisements may be maintained in one or more static positions occupying a portion of any display generated by the application.

Figure 2:
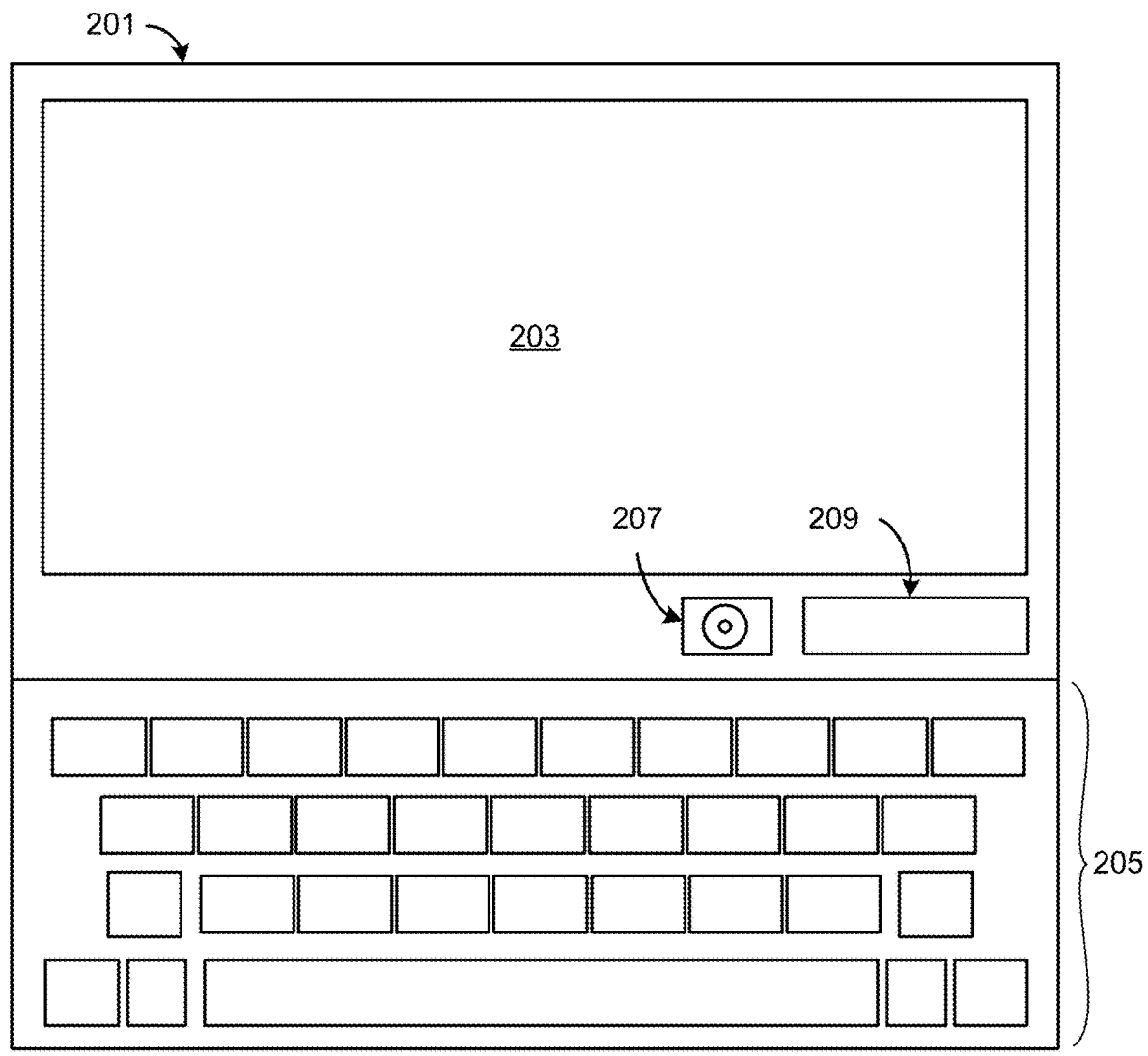
FIG. 2 shows a diagram of a first exemplary user interface instantiated by the system of FIG. 1A, in accordance with one or more embodiments of the invention.

FIGS. 2-5 depict exemplary graphical user interfaces generated by an instantiation of a social networking application in a client computing device. FIG. 2 depicts a first exemplary graphical user interface (200). According to one or more embodiments of the invention, FIG. 2 depicts an exemplary user interface for constructing a social network message in a social networking application. As depicted in FIG. 2, a window (201) may be instantiated that depicts a content panel (203) and a virtual user input device (205). As depicted in FIG. 2, the virtual user input device (205) may represent a virtual keyboard. A user may be able to initiate an audio recording session through the user interface via selection of a recording button (207) or other such interactive element. The interactive element may include, but is not limited to: touch-screen based input, hardware-based input (e.g., a physical button or knob), voice command recognition, or movement/haptic based input (e.g., shaking the client device or performing a pre-determined action or gesture with the client device). An audio recording and/or characters including a portion of text may be submitted via user input device (205) and submitted to the social network platform (and, e.g., displayed in the content panel (203)) via user selection of a second interactive element, such as interactive element (209).

Figure 3:
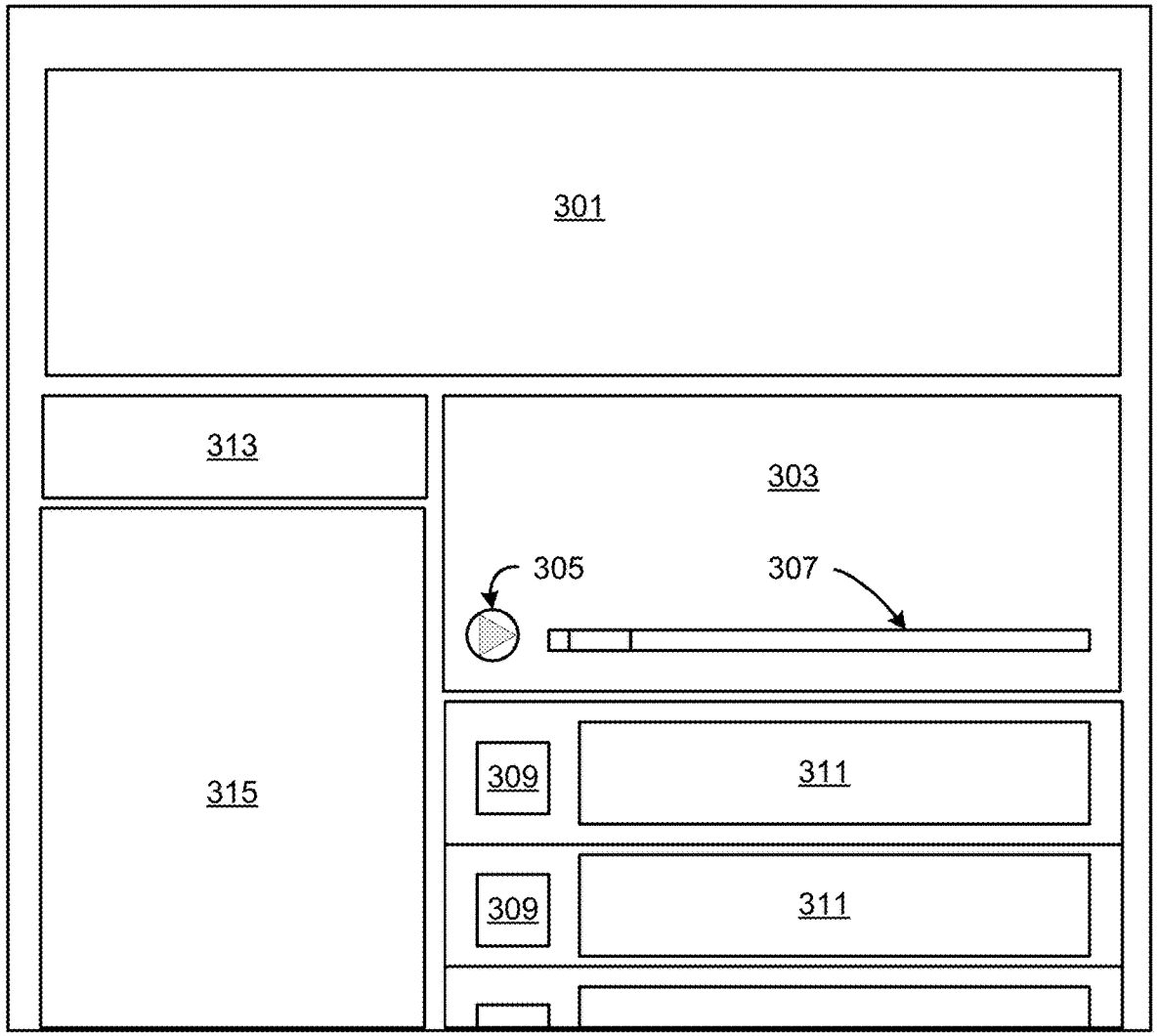
FIG. 3 shows a diagram of a second exemplary user interface instantiated by the system of FIG. 1A, in accordance with one or more embodiments of the invention.

FIG. 3 depicts a second exemplary graphical user interface (300). According to one or more embodiments of the invention, FIG. 3 depicts an exemplary graphical user interface of a social networking application corresponding to a social media account. As depicted in FIG. 3, the graphical user interface (300) may be instantiated that depicts an account header panel (301), a static message panel (303), and a set of social network messages (311). In one or more embodiments of the invention, the account header panel (301) may display information corresponding to the social media account, such as a social media ID, number of affiliated social network accounts, number of social network messages, etc. The static message panel (303) may display content corresponding to a designated social network message. In one or more embodiments, the social network message may include an audio recording, whereby playback may be commenced by selection of a graphical element (e.g., a graphical element (305)). Progress information such as the duration and current relative position of the audio recording may be displayed through a separate graphical element (e.g., a progress bar (307)).

In one or more embodiments, the social network message depicted in the static message panel (303) may be the most recent social network message received by the social media account. In one or more embodiments, the social network message depicted in the static message panel 303 may be an advertisement. The set of social network messages (311) may be received from one or more other social network accounts in the real-time messaging platform, the source of which may be identified according to a graphical icon or representation displayed in accompanying windows (309). Each of the set of social network messages (311) may contain a portion of text and/or graphical controls for controlling playback of an audio recording. In one or more embodiments of the invention, additional feature panels (313) and (315) may be implemented to provide further functionality. For example, user feedback may be submitted to the social network platform administrators via user input in the feature panel (313). The feature panel (315) may allow the user to toggle between various arrangements or views of affiliated social media accounts, received social network messages, etc. For example, received social network messages may be displayed to the user in reverse chronological order, chronological order, based on the relationship of the authoring user with the user, etc.

Figure 4:
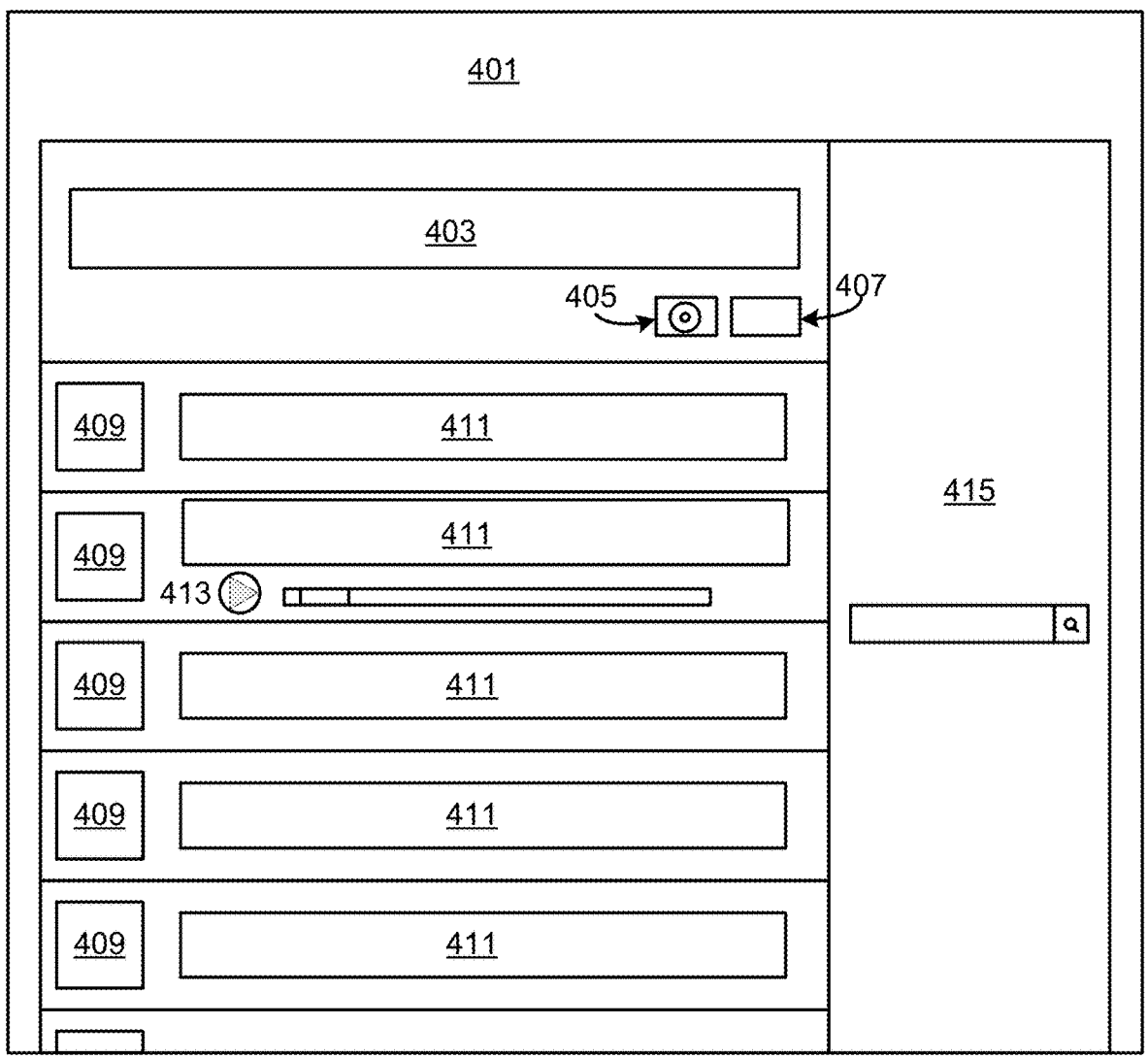
FIG. 4 shows a diagram of a third exemplary user interface instantiated by the system of FIG. 1A, in accordance with one or more embodiments of the invention.

FIG. 4 depicts a third exemplary graphical user interface (400). According to one or more embodiments of the invention, FIG. 4 depicts an exemplary graphical user interface of a social networking application corresponding to a display of social network messages received by a social media account. As depicted in FIG. 4, a window (401) may be instantiated that depicts a message panel (403), message construction elements (405) and (407), and a set of social network messages (411). In one or more embodiments of the invention, window (401) may be used to display a status message authored by the user of the social media account (e.g., via a separately generated interface). The message panel (403) may be used to display text submitted by the user (e.g., through a user input device such as a keyboard), which can be submitted to the real-time messaging platform via the graphical submission element (407). Alternatively, a user may initiate an audio recording session through selection of the graphical element (405). Social network messages received by the user may be displayed as a list (e.g., the messages (411)). In one or more embodiments, the social network messages may be arranged in reverse chronological order, and the authoring user of each social network message may be indicated by a graphical icon or other representation (e.g., icon (409)). In one or more embodiments of the invention, one or more of the social network messages (411)

may display the graphical controls (413) to manipulate the playback of a recorded audio snippet corresponding to a social message. Additional functionality (e.g., search functionality) may be provided through a function panel (415).

Figure 5:
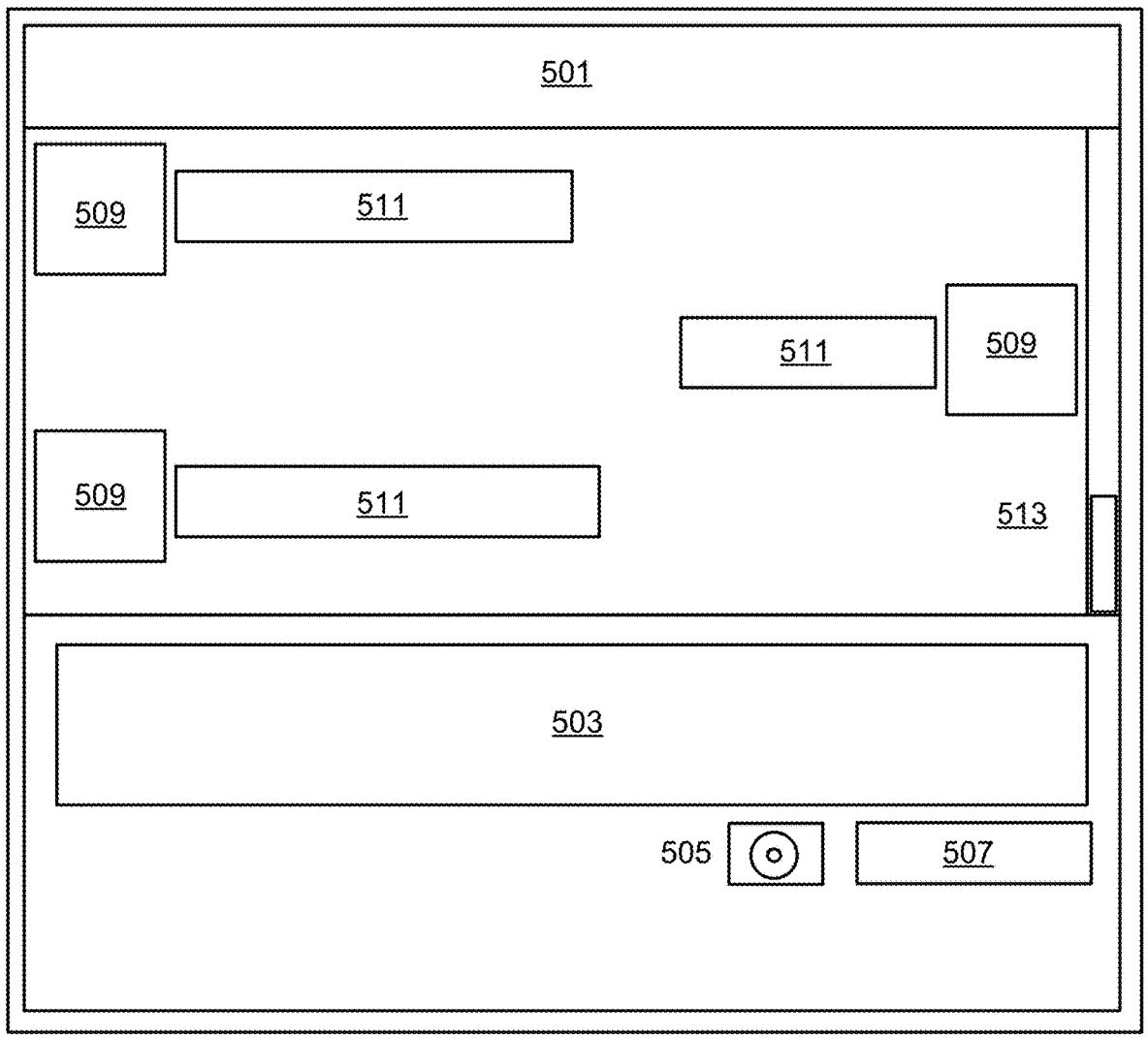
FIG. 5 shows a diagram of a fourth exemplary user interface instantiated by the system of FIG. 1A in accordance with one or more embodiments of the invention.

FIG. 5 depicts a fourth exemplary graphical user interface (500). According to one or more embodiments of the invention, FIG. 5 depicts an exemplary graphical user interface of a social networking application corresponding to a display of a conversation of social network messages between two social media accounts. As depicted in FIG. 5, the graphical user interface (500) may be instantiated that depicts a status panel (501), a set of messages (511), a message panel (503), and graphical elements (507), (509), and (513). In one or more embodiments of the invention, the status panel (501) may be used to display an identification of social media accounts participating in the conversation of social network messages. The social network messages (511) may be displayed in descending chronological order, and oriented according to the source. For example, in a conversation between two social media accounts, social network messages received from one source may be arranged with a consistent orientation that is distinguished from the orientation of the other participant in the conversation (e.g., to the right of the screen versus to the left of the screen), and the authoring user of each social network message may be indicated by a graphical icon or other representation (e.g., the graphical element (509)). The message panel (503) may be used to display text submitted by the user (e.g., through a user input device such as a keyboard), which can be submitted to the real-time messaging platform via a graphical submission element (505). Alternatively, a user may initiate an audio recording session through selection of the graphical element (507). In one or more embodiments, previously received social network messages may be scrolled through via actuation of a scroll bar (513).

Figure 6:
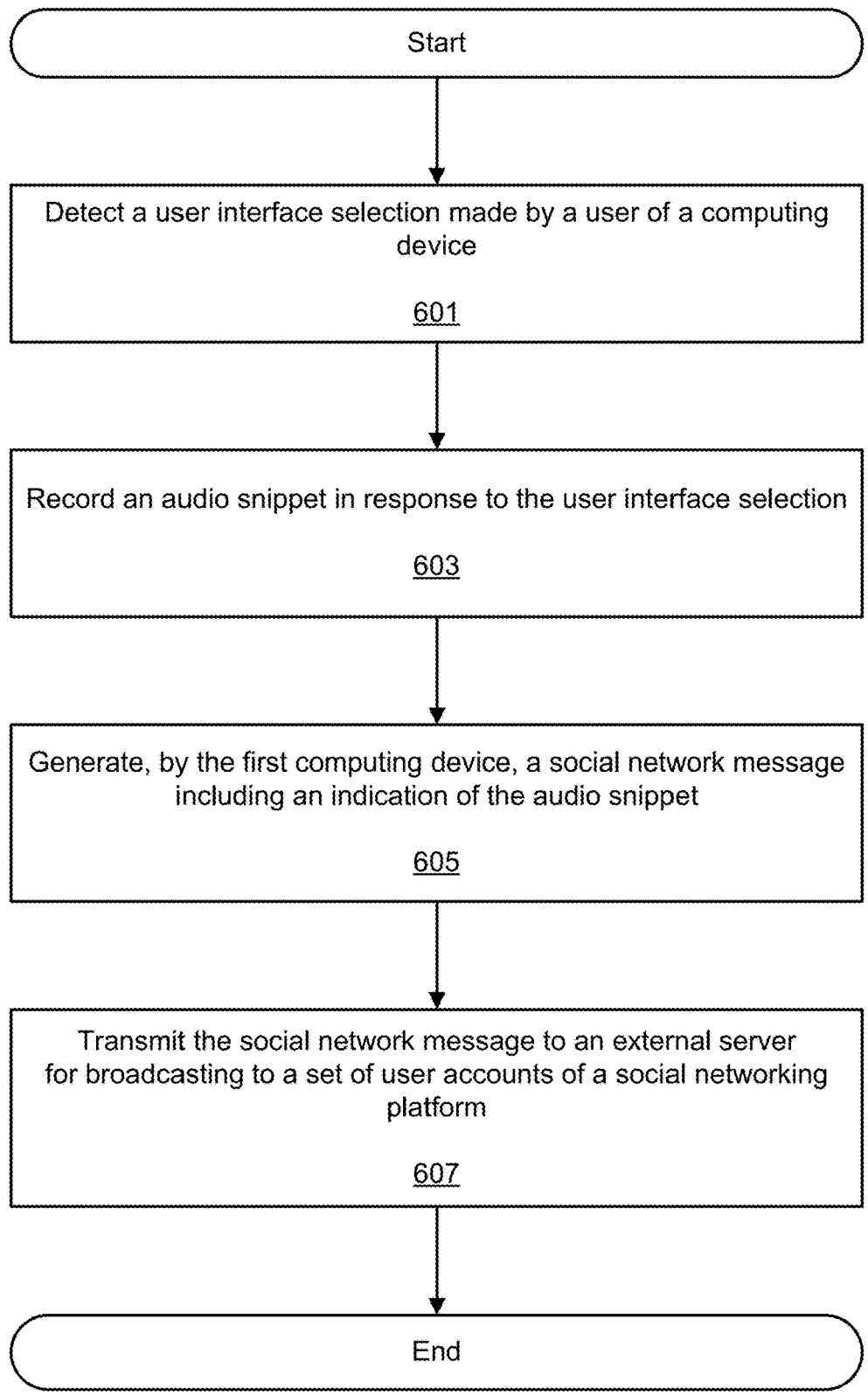
FIGS. 6 and 7 show flowcharts in accordance with one or more embodiments of the invention.

FIG. 6 shows a flowchart of a method for integrating audio recording and distributing. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 6 should not be construed as limiting the scope of the invention.

In STEP 601, a user selection in a user interface of a client computing device is detected. In one or more embodiments of the invention, the user selection includes a selection of a graphical button or other interactive element in a graphical user interface corresponding to initiation of an audio recording session. The graphical user interface may be generated as a portion of a social networking application executing on the client computing device. In one or more embodiments of the invention, the computing device may include mobile (e.g., smartphones, tablets, personal data assistants) or traditional (e.g., desktop, laptop) computing devices. The graphical button or other interactive element may include one of several interactive elements. Interactive elements may be implemented as physical hardware elements (buttons, knobs, etc.) or virtual touch-screen based elements in the graphical user interface (e.g., as depicted in FIGS. 2-5). In one or more embodiments of the invention, the user selection may include a verbal command recognized by the computing device. Upon selection, the computing device (e.g., via a microphone or other audio recording component) may commence recordation of audio for the immediate recording session.

In STEP 603, an audio snippet is recorded in response to the user interface selection. Termination of the audio recording session beginning in STEP 601 may be accomplished by a second, subsequent selection of the same or proximate interactive element in the graphical user interface. Alternately, termination of the audio recording session may be accomplished manually, such as by other user interaction with the mobile computing device (e.g., via user input devices); or automatically, via recognition of pre-determined verbal commands, or after a period of inactivity. According to one or more embodiments of the invention, the audio snippet may include (but is not limited to) one or more of: a musical performance; a vocal performance; a verbally transcribed message in the real-time messaging platform; a sound; an advertisement; an audio production; a spoken phrase; or a verbal utterance. According to one or more embodiments of the invention, the audio snippet may be limited to a pre-determined duration. When an audio snippet is recorded that exceeds the pre-determined duration, the excess portion of the snippet may be recorded as one or more separate audio snippets.

In STEP 605, a social network message is generated in the client computing device including an indication of the audio snippet. The portion of text may be submitted by a user via a user interface such as a keyboard, or a virtual construct such as a virtual keyboard. The portion of text may also include a verbal transcription of the audio snippet recorded in STEP 603. According to one or more embodiments of the invention, the portion of text may be limited to a certain pre-determined number of characters. A portion of text that exceeds the pre-determined limit may be reformatted as one or more additional portions of text. A social network message is generated that includes the portion(s) of text and audio snippet(s).

In STEP 607, the social network message including the text and audio snippet is transmitted to an external server. According to one or more embodiments of the invention, additional information may be submitted either manually by the user or automatically through the computing device, and transmitted to the external server. For example, the social network message may include an identification of one or more other users of a real-time messaging platform selected by the user to receive the social network message. In one or more further embodiments, an event (e.g., a musical performance) corresponding to the recorded audio snippet may be designated by the user (via the user interface) and transmitted to the external server at STEP 607. According to still one or more further embodiments, a geo-location (as determined via GPS or location determining services executing on the client device) of the client device may also be determined and transmitted at STEP 607.

In one or more further embodiments, prior to the transmission to the external server, one or more audio effects may be applied to the recorded audio snippets. Application of the one or more audio effects may be performed on the client device via selection of one or more additional graphical elements of the graphical user interface corresponding to the one or more audio effects. The audio effects may include, but are not limited to: an application of an audio filter of a set of audio filters, an edit of the audio snippet, a mesh of the audio snippet with a set of previously-stored audio snippets, and a concatenation of the audio snippet with a set of previously-stored audio snippets. In alternate embodiments, the selection of the audio effects may be performed by a user through a user interface executing in the client computing device, while the actual application of the effects may be performed externally. According to still one or more further embodiments of the invention, an audio identification is generated for the audio recording and transmitted to the server to determine a source of the audio recording.

Figure 7:
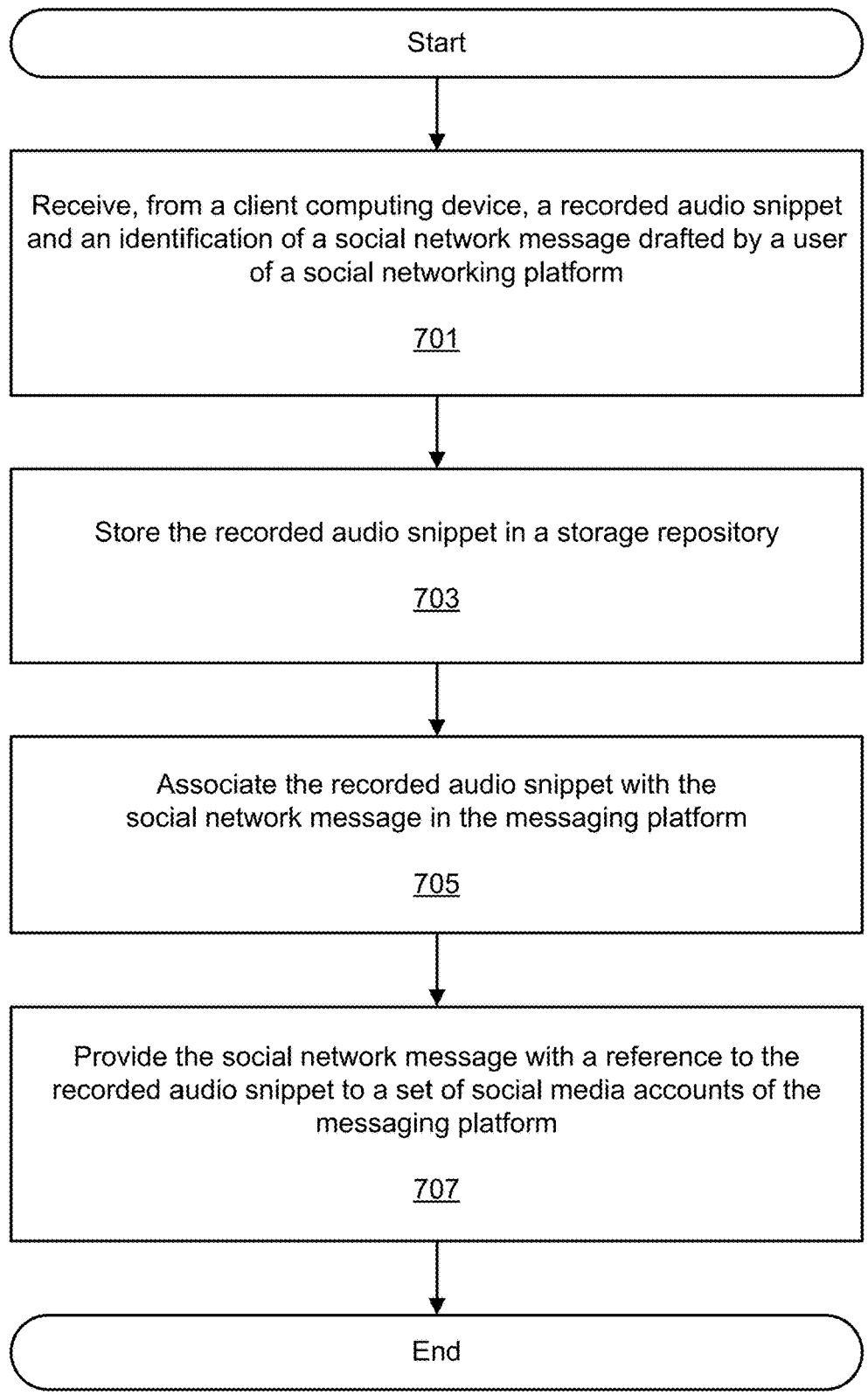

FIG. 7 shows a flowchart of a method for distributing social network messages (e.g., in a real-time messaging platform). While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 7 should not be construed as limiting the scope of the invention.

In STEP 701, a recorded audio snippet and an identification of a social network message drafted by a user of a social networking platform is received from a client computing device. In one or more embodiments, the recorded audio snippet may be transmitted through an API call of an instantiation of a social networking application executing in a client computing device, and received in a corresponding instantiation of the social networking application executing in the server. In one or more further embodiments of the invention, the recorded audio snippet may be received with a portion of text as a social network message. In still one or more further embodiments, the social network message may include data corresponding to one or more of: an identified event or occurrence, a geo-location of the client computing device, one or more audio effects to apply to the recorded audio snippet.

In STEP 703, the social network message (e.g., including the portion of text and/or the audio recording) received in STEP 701 is stored in a storage device, such as a database or repository (e.g., message repository 140). In one or more embodiments, the portion of text may be stored in a separate repository from the audio recording (e.g., stored in audio repository 148). According to one or more embodiments of the invention, an audio source of the audio recording may be identified from audio identification data submitted by the client computing device. The audio source may be determined by comparing the audio identification data with a separate database of identified audio sources and the audio identification data corresponding to the identified audio sources.

In STEP 705, the recorded audio snippet is associated with the social network message in the messaging platform. The association may be used to map the portion of text and the audio recording within the real-time messaging platform. In one or more embodiments of the invention the social network message may be mapped to other social network messages in the database or repository based on a shared characteristic or trait. For example, social network messages sharing a proximate geo-location and/or chronology may be mapped together. Other social network messages from the user, or other users identified by a user may be mapped together. Social network messages identified as corresponding to an event or occurrence may be mapped together. Social network messages containing audio recordings from the same identified audio source may also be mapped together.

In STEP 707, the social network message with a reference to the recorded audio snippet is provided to a plurality of social media accounts of the real-time messaging platform. The social media accounts a social network message is distributed to may be determined based on a manually designated list of social media accounts submitted by a user through the client computing device along with the social network message. According to alternate embodiments, the social network message may be distributed automatically to one or more pre-designated social media accounts. These social media accounts may be specifically identified by the authoring user and/or subscribed to by the receiving user corresponding to the social media account. In one or more further embodiments of the invention, the social network message may be viewed by any social media account navigating to the social media account of the authoring user. In still one or more further embodiments, the recipient social media accounts may be determined by referencing a connection graph generated and maintained in the real-time messaging platform and corresponding to the authoring user.

In one or more embodiments of the invention, the social network message is accessible to a user of the social media accounts receiving the social network message. Users of recipient social media accounts may, upon executing an instantiation of an application of the real-time messaging platform, view the portion of text included in the message, and/or enable playback of the audio recording directly through the application of the real-time messaging platform. In one or more embodiments of the invention, social network messages (with or without audio snippets) received by a social media account are displayed in a user interface of the real-time messaging platform application in list form. In one or more further embodiments, the messages may be organized within the list in reverse chronological order. In yet one or more further embodiments of the invention, a social network message may be fixed in a static position (e.g., at the top of list) by an administrator of the real-time messaging platform. For example, an advertisement may be displayed in a fixed position.

Playback of the audio recording in one or more social messages may commence (and be controlled) by selection of one or more graphical elements in the user interface by a user of the recipient social media account. Playback of the audio recording may automatically commence once initiation of the application is completed.

In one or more embodiments of the invention, the portion of text and/or an audio recording may be replaced with an updated portion of text and/or audio recording transmitted from the client computing device of the authoring user. In such instances, the authoring user may designate (e.g., through the user interface) to replace one or more portions of the social network message with a new version (e.g., a separate audio recording or a newly drafted portion of text).

Figure 8:
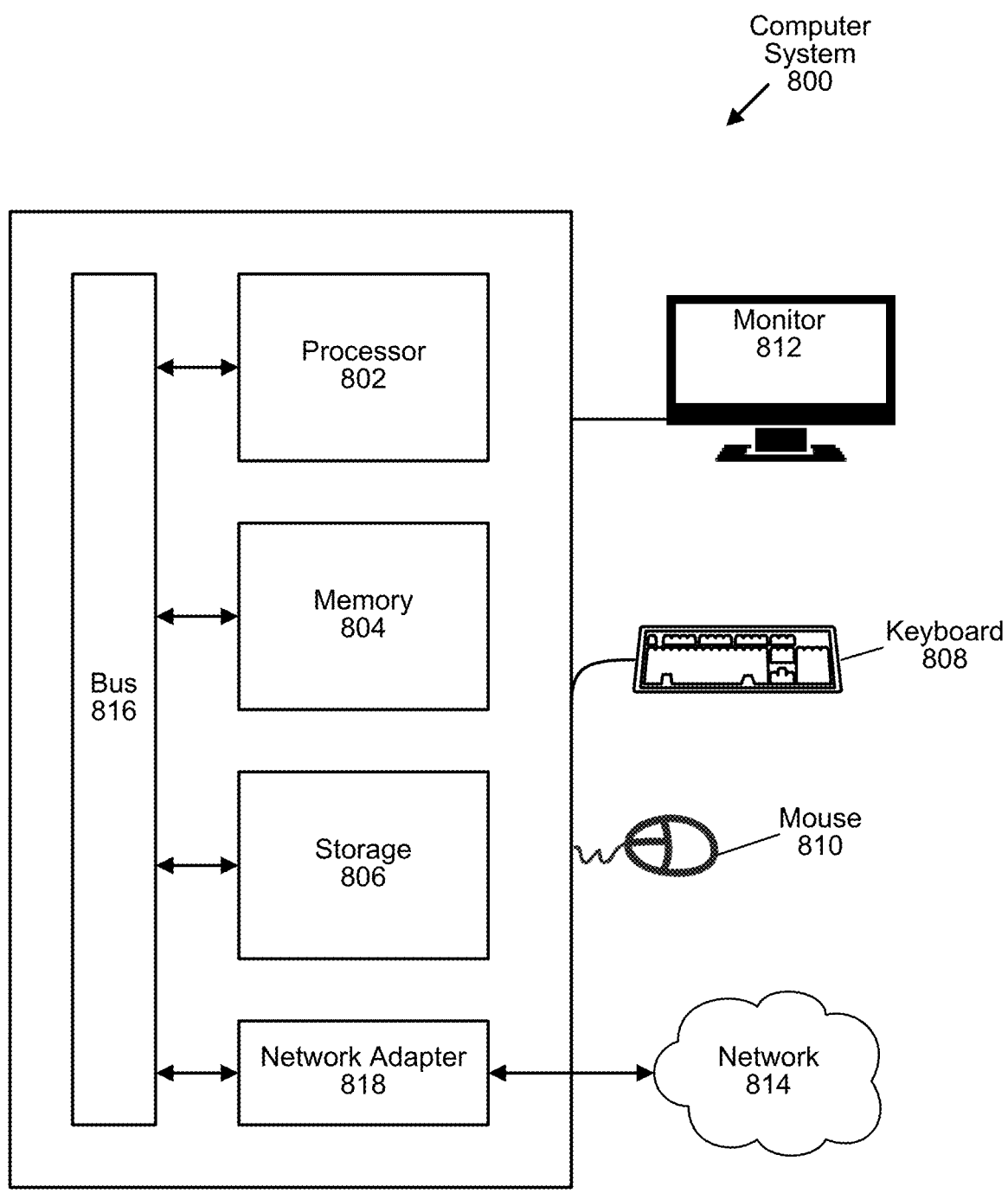
FIG. 8 shows a computer system in accordance with one or more embodiments of the invention.

In an alternate embodiment of the invention, the social network message may include a numeric code and a telephonic code. The telephonic code may be used to access an automated system, which upon entry of the numeric code will cause the automatic playback of the audio recording through the telephone system, without requiring an Internet connection or other access to the real-time messaging platform Embodiments of the invention may be implemented on virtually any type of computer regardless of the platform being used. For example, as shown in FIG. 8, a computer system (800) includes one or more processor(s) (802) (such as a central processing unit (CPU), integrated circuit, hardware processor, etc.), associated memory (804) (e.g., RAM, cache memory, flash memory, etc.), a storage device (806) (e.g., a hard disk, an optical drive such as a compact disk drive or digital video disk (DVD) drive, a flash memory stick, etc.), a network adapter (818), and numerous other elements and functionalities typical of today's computers (not shown). One or more components of the computer system (800) may be communicatively connected by a bus (816). The computer system (800) may also include input means, such as a keyboard (808), a mouse (810), or a microphone (not shown). Further, the computer system (800) may include output means, such as a monitor (812) (e.g., a liquid crystal display (LCD), a plasma display, or cathode ray tube (CRT) monitor). The computer system (800) may be connected to a network (814) (e.g., a local area network (LAN), a wide area network (WAN) such as the Internet, or any other type of network) via the network adapter (818). Those skilled in the art will appreciate that many different types of computer systems exist, and the aforementioned input and output means may take other forms. Generally speaking, the computer system (800) includes at least the minimal processing, input, and/or output means necessary to practice embodiments of the invention.

Further, in one or more embodiments of the invention, one or more elements of the aforementioned computer system (800) may be located at a remote location and connected to the other elements over a network. Further, embodiments of the invention may be implemented on a distributed system having a set of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources.

Further, one or more elements of the above described systems (e.g., FIGS. 1A, 1B, 8) can be implemented as software instructions in the form of computer readable program code stored, temporarily or permanently, on one or more non-transitory computer readable storage media. The non-transitory computer readable storage media are executable by one or more computer processors to perform the functionality of one or more components of the above-described systems (e.g., FIGS. 1A, 1B, 8) and/or flowcharts (e.g., FIGS. 6 and 7), in accordance with various embodiments of the invention. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

Figure 9:
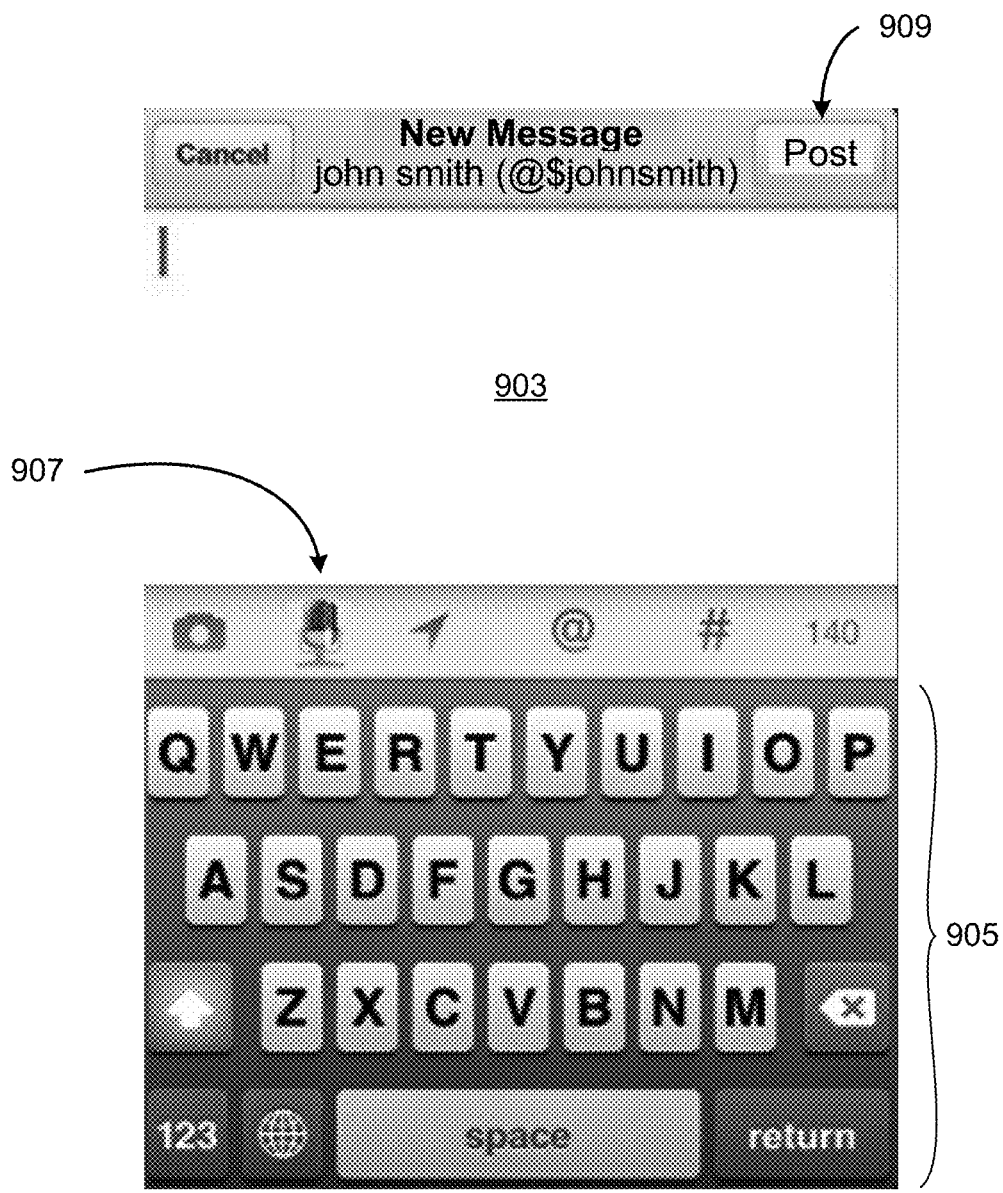
FIGS. 9, 10, and 11 show exemplary user interfaces displayed by the client of FIGS. 1A and 1B, in accordance with one or more embodiments of the invention.

FIG. 9 shows an exemplary user interface displayed by the client (105) of FIGS. 1A and 1B, in accordance with one or more embodiments of the invention. A content panel (903), a virtual user input device (905), a recording button (907), and a posting button (909) may be the same as or similar to the content panel (203), the virtual user input device (205), recording button (207), and interactive element (209) of FIG. 2, respectively.

Figure 10:
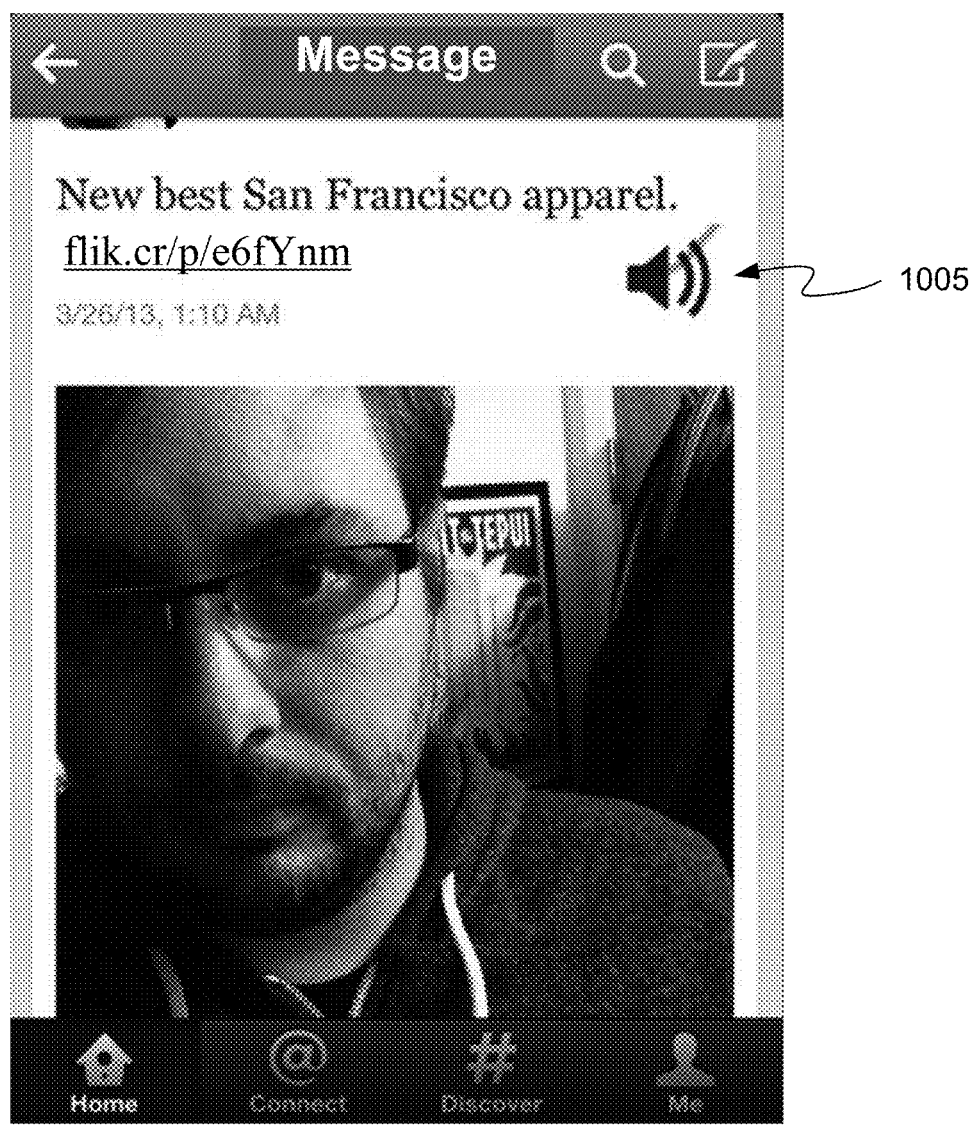

FIG. 10 shows an exemplary user interface displayed by the client (105) of FIGS. 1A and 1B, in accordance with one or more embodiments of the invention. An audio element (1005) may be the same as or similar to the graphical element (305) of FIG. 3. The audio element (1005) may indicate the presence of an audio recording and/or cause playback of the audio recording.

Figure 11:

FIG. 11 shows an exemplary user interface displayed by the client (105) of FIGS. 1A and 1B, in accordance with one or more embodiments of the invention. A playback button (1105) may be the same as or similar to the graphical element (305) of FIG. 3 and/or the graphical controls (413) of FIG. 4, a progress bar (1107) may be the same as or similar to the progress bar (307) of FIG. 3 and/or the graphical controls (413) of FIG. 4, and an icon (1107) may be the same as or similar to the icon (409) of FIG. 4.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for integrating audio recording and distributing, the method comprising:
  detecting a user interface selection made by a user of a client computing device at a geo-location;
  recording an audio snippet by the client computing device in response to the user interface selection;
  associating the audio snippet with the geo-location where the audio snippet was recorded;

comparing the geo-location where the audio snippet was recorded with location information for a plurality of events;
analyzing the audio snippet to determine an acoustic fingerprint in the audio snippet;
determining that the audio snippet is a recording of a portion of a particular audio source at an event of the plurality of events, wherein the determining is based on the acoustic fingerprint and comparing the geo-location where the audio snippet was recorded with the location information for the plurality of events, the geo-location being represented by information specifying a location of the client computing device when the audio snippet was recorded, wherein identifying the audio snippet as a recording of a portion of a particular audio source includes comparing the acoustic fingerprint with a plurality of acoustic fingerprints stored on a database;
presenting identification information of the particular audio source and the event to the user;
receiving, from the user, a confirmation message approving the identification information;
receiving textual content that is input by the user through a virtual keyboard, the textual content being related to the audio snippet recorded by the client computing device;
generating a social network message of a real-time messaging platform, the social network message including (i) the audio snippet or a link to the audio snippet, and (ii) a textual message including information of the location and the identification information of the particular audio source and the event, wherein the textual message further includes the textual content input by the user; and
transmitting the social network message to the real-time messaging platform for providing the social network message to selected social media accounts to provide real-time information about the event, each account in the selected social media accounts being part of a connection graph of a user account of the user and having a predefined relationship with the user in the real-time messaging platform.

2. The method of claim 1, wherein generating the social network message comprises:
translating a verbal portion of the audio snippet into a portion of the textual message; and
including the portion of the textual message in the social network message.

3. The method of claim 1, wherein the audio snippet contains certain words or phrases that correspond to respective pre-specified action terms in the real-time messaging platform, and wherein transmitting of the social network message to the selected social media accounts is performed based on the pre-specified action terms.

4. The method of claim 1, wherein detecting the user interface selection is repeated automatically in response to an action, wherein the action comprises at least one action selected from a group consisting of:
detecting a pre-specified audio command received from the user; and
detecting a period of audio inactivity.

5. The method of claim 1, further comprising determining, based on an association of the audio snippet with the event, that the textual content of the social network message drafted by the user is associated with the event.

6. The method of claim 1, wherein the audio snippet is automatically played when the social network message is displayed in a stream of messages.

7. The method of claim 1, wherein the audio snippet is transmitted to selected social media accounts included in an active exchange session,
wherein an active exchange session is a temporary session between a social media account of the user and the selected social media accounts that facilitates real-time exchange of messages between the social media account of the user and the selected social media accounts, and
wherein during the active exchange session subsequent audio snippets are routed to the selected social media accounts without further user interface selection.

8. The method of claim 1, wherein the textual message of the social network message includes a text portion corresponding to a transcription of a portion of the audio snippet, and wherein the transcription includes a visual indicator identifying an identified highly topical, popular, or trending term.

9. The method of claim 1, further comprising:
receiving an input from the user through the client computing device instructing the real-time messaging platform to replace one or more portions of the social network message with a new audio snippet or new text;
obtaining an updated social network message by replacing the one or more portions of the social network message with the new audio snippet or the new text; and
transmitting the updated social network message to the real-time messaging platform.

10. The method of claim 7, wherein the subsequent audio snippets are concurrently recorded and routed to the selected social media accounts.

11. The method of claim 1, wherein the textual content is determined to be related to the audio snippet based on one or more characters typed in the textual content.

12. A method for distributing recorded audio snippets, the method comprising:
receiving, from a client computing device, a recorded audio snippet and an associated identification of a social network message, the social network message having a first portion being about the audio snippet and being drafted by a user of a real-time messaging platform through a virtual keyboard;
associating the audio snippet with geo-location information specifying a location of the client computing device where the audio snippet was recorded;
comparing the geo-location information with location information for a plurality of events;
analyzing the audio snippet to determine an acoustic fingerprint of the audio snippet;
determining that the audio snippet is a recording of a portion of a particular audio source at an event of the plurality of events, wherein the determining is based on the acoustic fingerprint and comparing the geo-location information with the location information for the plurality of event, wherein identifying the audio snippet as a recording of a portion of a particular audio resource includes comparing the acoustic fingerprint with a plurality of acoustic fingerprints stored on a database;
presenting identification information of the particular audio resource and the event to the user;
receiving, from the user, a confirmation message approving the identification information;
in response to receiving the confirmation message, generating a second portion of the social network message including (i) the audio snippet or a link to the audio snippet, and (ii) a text describing the location, and the identification information of the particular audio resource and the event;

selecting a plurality of social media accounts of the real-time messaging platform, each account in the selected social media accounts being part of a connection graph of a user account of the user and having a predefined relationship with the user in the real-time messaging measuring platform; and providing the social network message including the first portion and the second portion to the selected social media accounts to provide real-time information about the event, wherein the selecting is based on shared characteristics.

13. The method of claim 12, further comprising:

determining, based on a shared element, a plurality of social network messages related to the audio snippet; and aggregating the social network message and the plurality of social network messages as an association of related messages.

14. The method of claim 12, further comprising:

statically positioning a display of the social network message and a reference to the recorded audio snippet in a social media page of the real-time messaging platform.

15. The method of claim 12, further comprising:

determining, based on the association of the audio snippet with the event, that the first portion of the social network message drafted by the user is associated with the event.

16. The method of claim 12, further comprising:

identifying a plurality of social network messages associated with the social network message drafted by the user, wherein at least one of the plurality of social network messages is associated with the social network message drafted by the user by sharing at least one of a proximate geolocation, a chronology, or audio source;

associating the plurality of social network messages with the event; and providing the plurality of social network messages to the selected social media accounts.

17. The method of claim 12, further comprising:

in response to providing the social network message to the selected social media accounts:

receiving, from the user through the client computing device, an instruction to replace one or more portions of the social network message with at least one of a new audio snippet or a new text;

replacing the one or more portions of the social network message with the at least one of the new audio snippet or the new text to obtain an updated social network message; and providing the updated social network message to the selected social media accounts by replacing the social network message with the updated social network message so that users of the selected social media accounts view the updated social network message instead of the social network message.

18. A system for distributing recorded audio snippets, the system comprising:

a computing system; and a memory comprising one or more instructions executable on the computing system to enable the computing system to perform operations comprising:

receiving, from a client computing device, a recorded audio snippet and an associated identification of a social network message, the social network message having a first portion about the audio snippet and drafted by a user of a real-time messaging platform through a virtual keyboard;

associating the audio snippet with a geo-location specifying a location of the client computing device where the audio snippet was recorded;

comparing the geo-location where the audio snippet was recorded with location information for a plurality of events;

analyzing the audio snippet to determine an acoustic fingerprint of the audio snippet;

determining that the audio snippet is a recording of a portion of a particular audio source at an event of the plurality of event, wherein the determining is based on the acoustic fingerprint and comparing the geo-location where the audio snippet was recorded with location information for the plurality of events, wherein identifying the audio snippet as a recording of a portion of a particular audio source includes comparing the acoustic fingerprint with a plurality of acoustic fingerprints stored on a database;

presenting identification information of the particular audio source and the event to the user;

receiving, from the user, a confirmation message approving the identification information;

in response to receiving the confirmation message, generating a second portion of the social network message including (i) the audio snippet or a link to the audio snippet, and (ii) a text describing the location, and the identification information of the particular audio source and the event; and selecting a plurality of social media accounts of the real-time messaging platform, each account in the selected social media accounts being part of a connection graph of a user account of the user and having a predefined relationship with the user in the real-time messaging platform; and providing social network message including the first portion and the second portion to the selected social media accounts to provide real-time information about the event, wherein the selecting is based on shared characteristics.

19. The system of claim 18, wherein the operations further comprise:

determining, based on a shared element, a plurality of social network messages related to the audio snippet; and aggregating the social network message and the plurality of social network messages as an association of related messages.

20. The system of claim 18, wherein the operations further comprise:

determining, based on the association of the audio snippet with the event, that the first portion of social network message drafted by the user is associated with the event.

21. The system of claim 18, further comprising:

identifying a plurality of social network messages associated with the social network message drafted by the user, wherein at least one of the plurality of social network messages is associated with the social network message drafted by the user by sharing at least one of a proximate geolocation, a chronology, or audio source;

associating the plurality of social network messages with the event; and providing the plurality of social network messages to the selected social media accounts.

22. A non-transitory, computer-readable medium storing one or more instructions executable by a computer system to perform operations comprising:
   detecting a user interface selection made by a user of a client computing device at a geo-location;
   recording an audio snippet by the client computing device in response to the user interface selection;
   associating the audio snippet with the geo-location where the audio snippet was recorded;
   comparing the geo-location where the audio snippet was recorded with location information for a plurality of events;
   analyzing the audio snippet to determine an acoustic fingerprint in the audio snippet;
   determining that the audio snippet is a recording of a portion of a particular audio source at an event of the plurality of events, wherein the determining is based on the acoustic fingerprint and comparing the geo-location where the audio snippet was recorded with location information for the plurality of events, the geo-location being represented by information specifying a location of the client computing device when the audio snippet was recorded, wherein identifying the audio snippet as a recording of a portion of a particular audio source includes comparing the acoustic fingerprint with a plurality of acoustic fingerprints stored on a database;
   presenting identification information of the particular audio source and the event to the user;
   receiving, from the user, a confirmation message approving the identification information;
   receiving textual content that is input by the user through a virtual keyboard, the textual content being related to the audio snippet recorded by the client computing device;
   generating a social network message of a real-time messaging platform, the social network message including (i) the audio snippet or a link to the audio snippet, and (ii) a textual message including information of the location and the identification information of the particular audio source and the event, wherein the textual message further includes the textual content input by the user; and
   transmitting the social network message to the real-time messaging platform for providing the social network message to selected social media accounts to provide real-time information about the event, each account in the selected social media accounts being part of a connection graph of a user account of the user and having a predefined relationship with the user account in the real-time messaging platform.

23. The non-transitory, computer-readable medium of claim 22, wherein the textual message of the social network message includes a text portion corresponding to a transcription of a portion of the audio snippet, and wherein the transcription includes a visual indicator identifying an identified highly topical, popular, or trending term.

24. The non-transitory, computer-readable medium of claim 22, further comprising instructions executable by a computer system to perform operations comprising:
   receiving an input from the user through the client computing device instructing the real-time messaging platform to replace one or more portions of the social network message with a new audio snippet or new text; and
   obtaining an updated social network message by replacing the one or more portions of the social network message with the new audio snippet or the new text; and
   transmitting the updated social network message to the real-time messaging platform.

25. The non-transitory, computer-readable medium of claim 22, wherein generating the social network message comprises:
   translating a verbal portion of the audio snippet into a portion of the textual message; and
   including the portion of the textual message in the social network message.

* * * * *

UNITED STATES PATENT AND TRADEMARK OFFICE
CERTIFICATE OF CORRECTION

Page 1 of 1

PATENT NO. : 11,086,592 B1
APPLICATION NO. : 14/080706
DATED : August 10, 2021
INVENTOR(S) : Sean Wang It is certified that error appears in the above-identified patent and that said Letters Patent is hereby corrected as shown below:

In the Claims

Column 21, Line 9, Claim 12, before "platform;" delete "measuring".

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*